United States Patent [19]

Blinks et al.

[11] Patent Number: 4,581,803
[45] Date of Patent: Apr. 15, 1986

[54] METHOD OF FORMING DOUBLE WRAP BRAKE BANDS

[75] Inventors: John C. Blinks, Lombard; Lauri J. Kivisto, Glen Ellyn, both of Ill.

[73] Assignee: Borg-Warner Corporation, Chicago, Ill.

[21] Appl. No.: 686,517

[22] Filed: Dec. 26, 1984

Related U.S. Application Data

[62] Division of Ser. No. 310,340, Oct. 9, 1981.

[51] Int. Cl.⁴ .................................................. B23P 17/00
[52] U.S. Cl. ............................................... 29/418; 29/416
[58] Field of Search ........................ 29/418, 416, 434; 188/269, 261

[56] References Cited

U.S. PATENT DOCUMENTS

| | | | |
|---|---|---|---|
| 2,704,882 | 3/1955 | Olson | 29/159.2 |
| 2,841,864 | 7/1958 | Kelly | 29/418 |
| 2,867,898 | 1/1959 | Vosler et al. | 29/416 |
| 2,887,771 | 5/1959 | Holdeman et al. | 29/418 |

FOREIGN PATENT DOCUMENTS

| | | | |
|---|---|---|---|
| 618500 | 2/1949 | United Kingdom | 188/77 R |
| 1348352 | 3/1974 | United Kingdom | 188/77 R |

Primary Examiner—Howard N. Goldberg
Assistant Examiner—Steven Nichols
Attorney, Agent, or Firm—James A. Geppert

[57] ABSTRACT

An improved double wrap brake band for an automatic transmission and the method of making the band wherein the band is lightweight and heat set round at the released open position with the utilization of thinner strap material at higher hardness ranges. The band is formed from a preslotted and preformed strap and a stamped one-piece bracket member secured to the strap. The band subassembly is heat treated and heat set, the interior surface is acid etched and a preslotted friction lining applied to the interior treated surface, the subassembly is sized, and the connecting ties for both the strap and bracket member are removed to provide the final band assembly.

8 Claims, 20 Drawing Figures

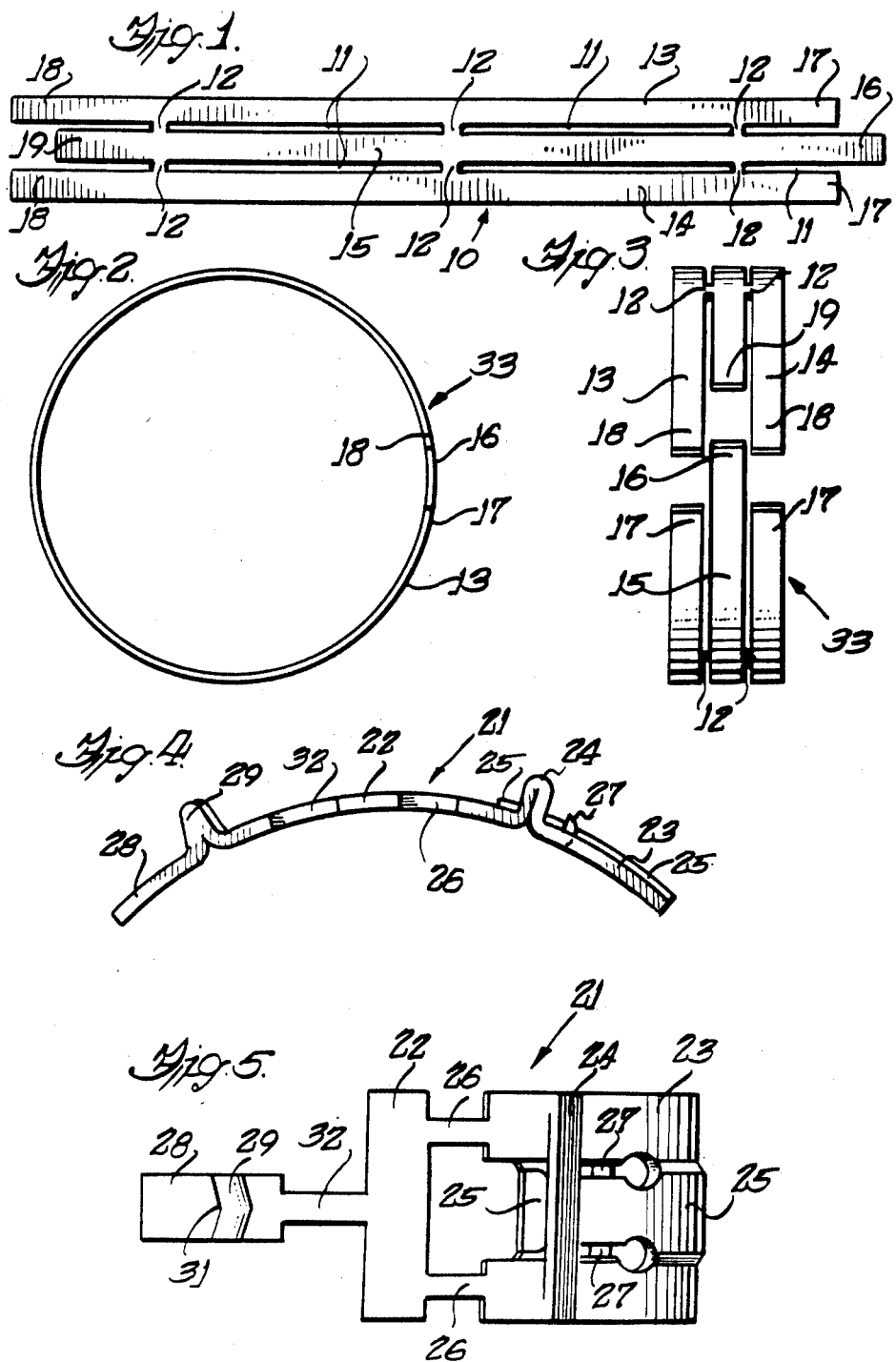

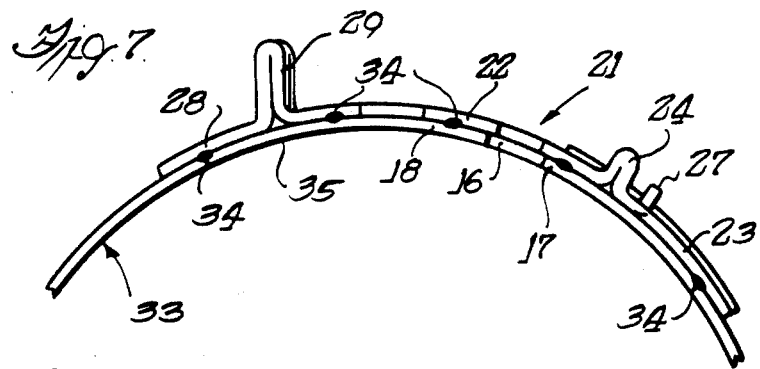
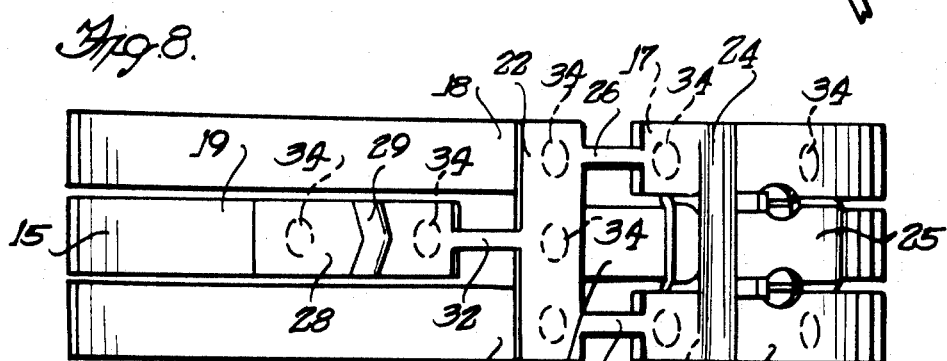
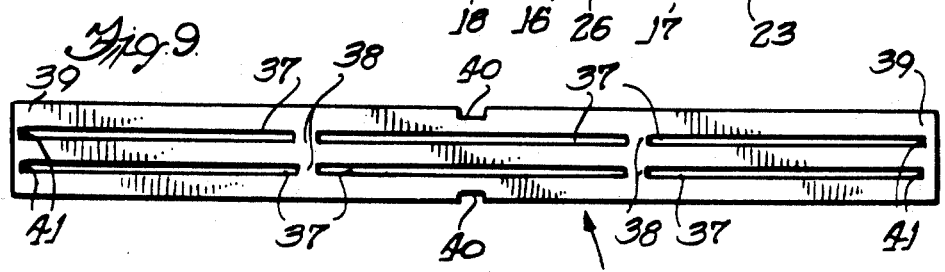
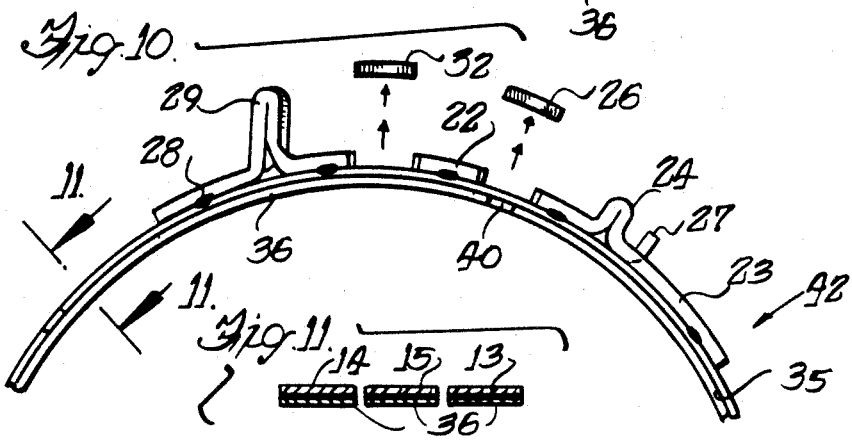

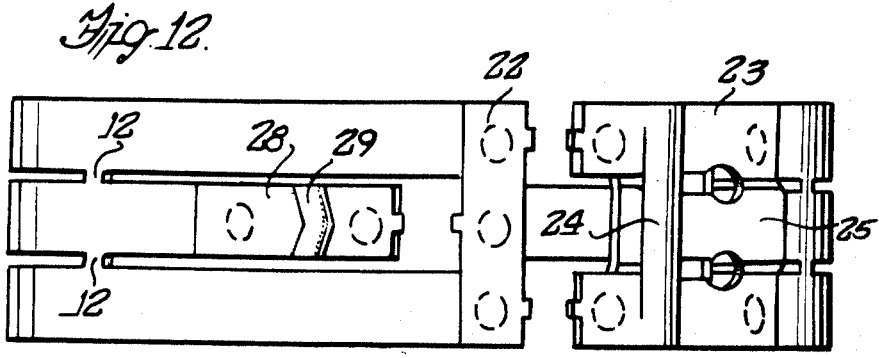
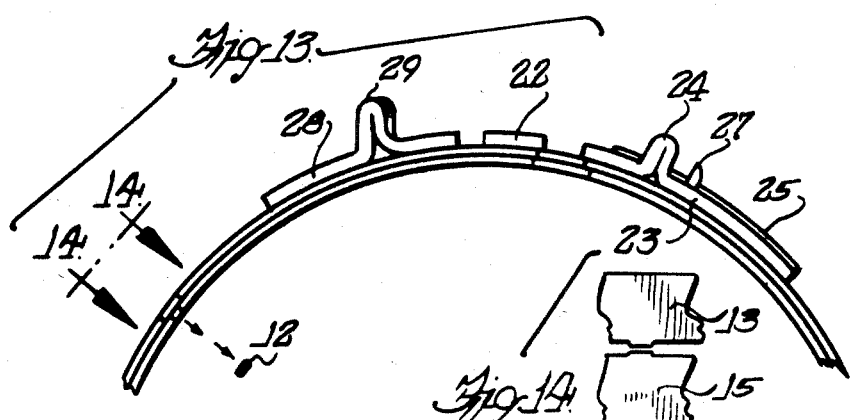
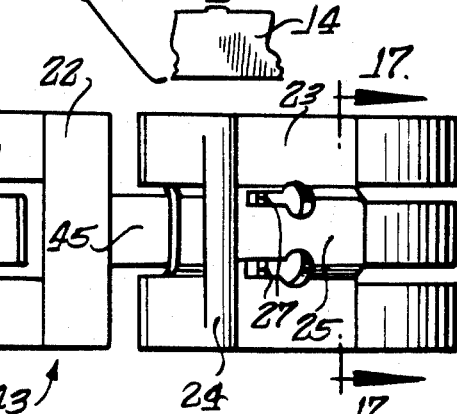
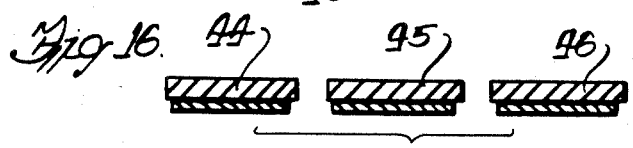

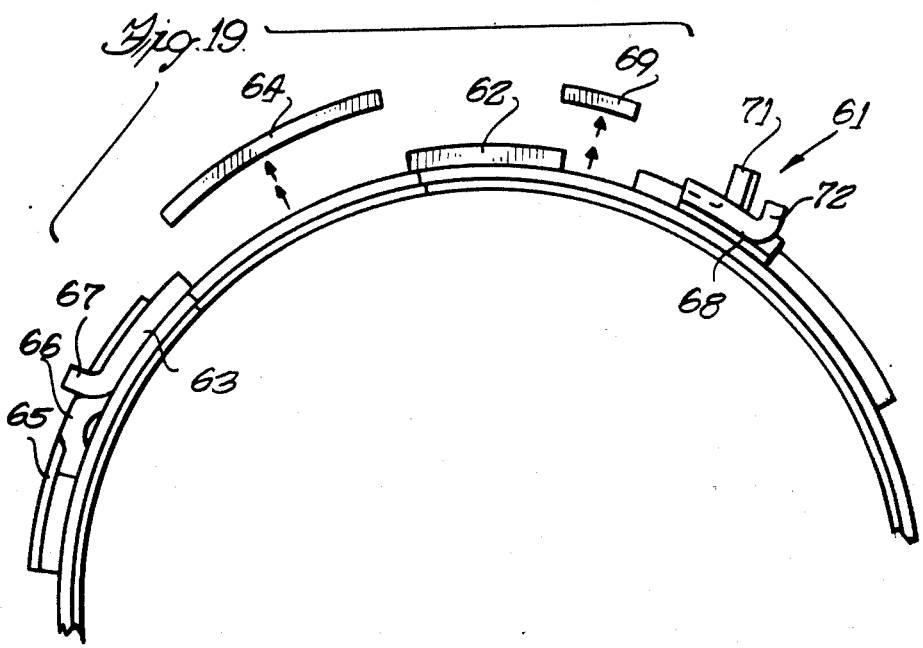
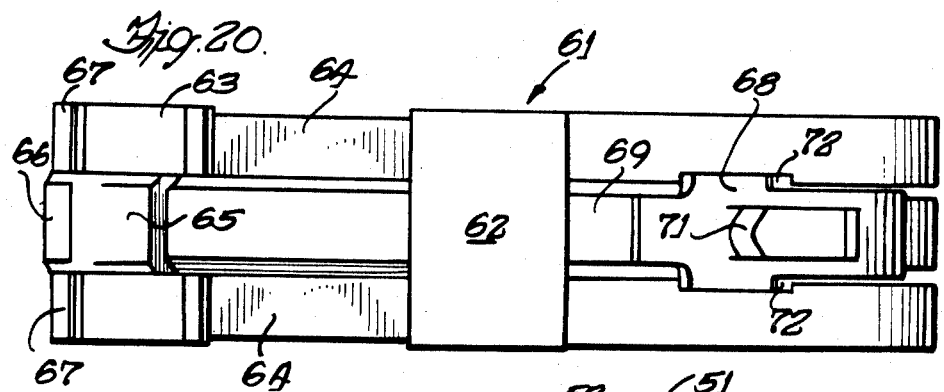
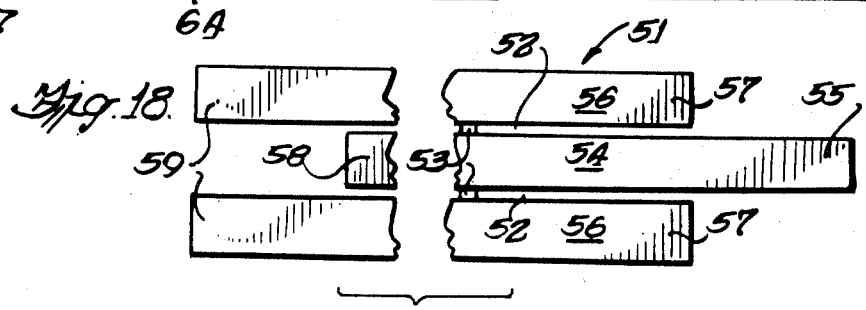

METHOD OF FORMING DOUBLE WRAP BRAKE BANDS

This is a division of application Ser. No. 310,340 filed Oct. 9, 1981.

BACKGROUND OF THE INVENTION

The present invention relates to an improved double wrap brake band and the method of making same for use in the automatic transmission of an automotive vehicle. In a conventional automatic transmission of the torque converter type, a driven shaft extends from the torque converter into the transmission to a unit having one or more clutch drums around which are placed double wrap brake bands; and more specifically, the double wrap bands are used for the 1-2 unit and for the reverse unit. It is the function of the brake bands under suitable hydraulic controls to effect gear change and control of the direction of rotation of the output or drive shaft from the transmission.

Presently manufactured double wrap brake bands are formed from a relatively thick metal strap and a forging or casting forming ears and a transverse tie for the band; the ears being engaged by the struts and a hydraulic piston in the transmission to actuate the band. The forging or casting is located in the space between the ends of the arcuate strap and the edges of the casting and strap are butt welded together. As seen in U.S. Pat. No. 2,867,898, once the bracket is welded to the strap, the assembly is expanded to size and shape, the bracket is transversely broached to form the transverse tie and ears separated by parallel slots and to form "V" slots in the ears to accommodate the struts, openings are pierced in the bottom wall of the broached slots, the interior surface of the assembly is shot peened and the friction lining is bonded to the surface. After bonding, openings are pierced in the friction material, the interior surface is bored, the friction lining is circumferentially grooved, and two circumferential slots are formed through the assembly, except the transverse tie, by sawing through the strap and lining to produce the three radially expansible bands.

The double wrap bands made by the above enumerated method have certain disadvantages in operation. The internal stesses created in the bands during manufacture will distort the bands so that they are not round in the released position. Thus, when assembled in an automatic transmission, there will be a certain amount of drag between the bands and its associated drum. Also, when the bands are actuated to engage the drum, a lack of concentricity of the outer and middle bands results in uneven engagement of the band. The double wrap brake band of the present invention obviates the disadvantages of the previously used bands.

SUMMARY OF THE INVENTION

The present invention comprehends the provision of an improved double wrap brake band which is formed from a preformed and preslotted stamped strap and a separate stamped one-piece bracket member. The band and bracket are formed from thinner gauge sheet metal for improved cost and lighter weight with the material having a higher hardness range. The bracket and strap are secured together, and the assembly is heat set round in the released position to decrease the drag of the band on the clutch drum when the band is released.

The present invention also comprehends the provision of an improved double wrap brake band utilizing a preslotted non-asbestos friction lining. Less material is required for the band, and there is better axial alignment of the outside and middle bands in the free position. Also, there is a better engaged conformity of the double wrap band with all three bands in substantially uniform engagement with the clutch drum.

The present invention further comprehends the provision of a unique one-piece bracket member for joining the free ends of the preslotted strap together. The bracket member comprises an anchor portion having a central bridging section, a transverse connecting bar and an apply portion; all joined together by longitudinally extending generally parallel ties. The bridging section of the anchor portion connects the anchor ends of the outer bands together to improve the alignment of the straps and thereby improves engagement of the band. Also, the transverse connecting bar is secured to the static ends of all three bands formed from the strap.

The present invention further comprehends the provision of an improved process for the manufacture of the double wrap band. A preslotted strap is formed into a curved configuration and a preslotted metal bracket member is spot welded to the strap; both the strap and bracket having tie portions retaining a unitary assembly. The assembly is heat treated, heat set and the interior surface prepared for bonding. A preslotted friction lining is bonded to the interior surface of the band, and the ties in the strap and bracket are removed to provide the final double wrap band.

Further objects are to provide a construction of maximum simplicity, efficiency, economy and ease of operation, and such further objects, advantages and capabilities as will later more fully appear and are inherently possessed thereby.

DESCRIPTION OF THE DRAWINGS

FIG. 1 is a top plan view of the preslotted strap forming the double wrap band.

FIG. 2 is a side elevational view of the strap in a curved condition.

FIG. 3 is a top plan view of the curved strap.

FIG. 4 is a side elevational view of the bracket member for the band.

FIG. 5 is a top plan view of the bracket member.

FIG. 7 is a partial side elevational view of the assembled strap and bracket secured together.

FIG. 8 is a top plan view of the assembly.

FIG. 9 is a top plan view of the preslotted friction lining for the band.

FIG. 10 is a side elevational view of the band assembly with the bracket ties being removed.

FIG. 11 is a cross sectional view taken on the line 11—11 of FIG. 10.

FIG. 12 is a top plan view of the band assembly with the bracket tie straps removed.

FIG. 13 is a side elevational view of the band assembly with the strap ties removed.

FIG. 14 is a top plan view of a portion of the band showing the strap ties removed.

FIG. 15 is a top plan view of the final band assembly.

FIG. 16 is a cross sectional view taken on the line 16—16 of FIG. 15.

FIG. 18 is a top plan view of a strap for a reverse band.

FIG. 19 is a side elevational view of the bracket and strap with the bracket ties removed.

FIG. 20 is a top plan view of the assembled bracket and strap.

DESCRIPTION OF THE PREFERRED EMBODIMENTS

Figure 6:
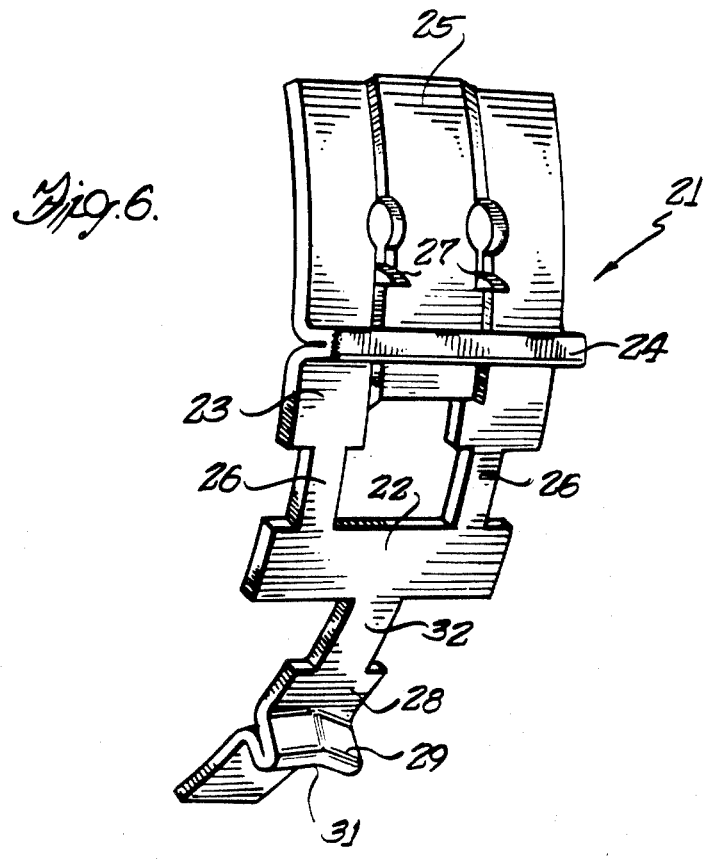
FIG. 6 is an enlarged perspective view of the bracket member.
Figure 17:
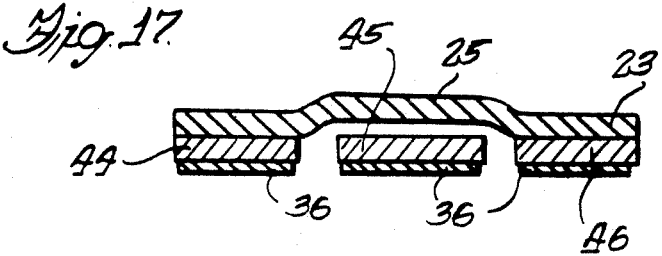
FIG. 17 is a cross sectional view taken on the line 17—17 of FIG. 15.

Referring more particularly to the disclosure in the drawings wherein are shown illustrative embodiments of the present invention, FIG. 1 discloses the preslotted flat strap 10 which forms the basis for the final double wrap brake band. The strap includes two parallel lines of elongated slots 11 separated by transversely aligned ties 12 to form parallel outside bands or band segments 13 and 14 and a middle band or band segment 15. One end 16 of the middle band extends beyond the ends 17,17 of the outside band, while at the opposite end, the ends 18,18 of the outside bands project beyond the end 19 of the middle band. The slotted band is formed into a curved member 33 (FIGS. 2 and 3).

An important aspect of the present invention resides in a one-piece anchor bracket member 21 (FIGS. 4, 5 and 6) formed by stamping the bracket member from sheet metal to provide a longitudinally curved member. The bracket member 21 includes a central transverse connecting bar portion 22 having a width equal to the width of the strap 10, an anchor portion 23 extending the width of the strap and having an upwardly folded or crimped ridge 24 and a raised central bridging section or portion 25 on each side of and extending under the crimped, convex ridge 24; the anchor portion being integral with the transverse connecting bar portion 22 through a pair of parallel ties 26,26. The anchor portion 23 of bracket member 21 serves the unique purpose of connecting the anchor ends 17,17 of the outer bands 13 and 14 to improve the alignment of the bands 13,14 during engagement. A pair of upwardly bent positioning tabs 27,27 are stamped out of the anchor portion adjacent but rearwardly of the folded ridge 24; the tabs or ears 27 functioning as locating members. Extending from the opposite side of the transverse connecting bar portion 22 is a centrally located longitudinally extending apply portion 28 having an upwardly crimped or folded lip 29 with an indented central area 31; the apply portion being attached to the transverse bar portion 22 by a tie 32.

The anchor bracket member 21 is a one-piece stamping that is located on the ends of the strap 10 when it is formed or curved into a generally arcuate member 33 with the central band 15 extending under the raised bridging section 25 of the bracket member. The bracket member is spot welded as at 34 to the ends 16,19 of the middle band and the ends 17,17,18,18 of the outer bands (FIGS. 7 and 8). After spot welding, the bracket and curved strap may be copper brazed together to improve the reliability over a simple welded assembly.

After spot welding and/or brazing at a temperature in the range of 2030° to 2050° F., the assembly is held for five minutes at the elevated temperature and then heat treated by heating to a temperature in the range of 1550° to 1700° F. and quenched in hot or cold (100° F.-350° F.) oil to provide a Rockwell C scale hardness of 54 to 58. Then the assembly is predrawn at a temperature of approximately 400° F. for about 35 minutes to a Rockwell C scale hardness of 50 to 54. Finally, the assembly is heat set to the desired diameter over an expanding fixture at a temperature in the range of 700° to 740° F. over a time period of 20 to 30 minutes to produce a Rockwell C scale hardness of 40 to 45.

A preslotted non-asbestos friction lining 36 (FIG. 9) is applied to the interior surface 35 of the band assembly after the surface is prepared by an acid etch or other suitable surface preparation. The lining also is formed with elongated longitudinal parallel slots 37 separated by transverse ties 38. The ends 39 of the bands formed by the slots are also joined by ties 41 rather than the open slots of the strap 10. The lining is bonded to the surface 35 by a suitable adhesive at a temperature in the range of 400° to 440° F. at the bond line for two minutes with the ties 38 aligned with the ties 12 of the strap 10 and positioning notches 40 aligned with the ties 26 of the bracket member; the ends of the lining being positioned substantially diametrically opposite to the bracket member 21.

Once the lining is bonded to the band assembly to form the assembly 42, the ties 26,26 joining the portion 23 to the connecting bar portion 22 and the tie 32 joining the apply portion 29 to the bar portion are cut out (FIGS. 10, 11 and 12). Then the ties 12 and 38 in the strap and liner, respectively, are removed by punching or other suitable operation (FIGS. 13 and 14) to form the interconnected three bands 44,45,46 of the final assembly 43 (FIG. 15). This assembly has a better alignment of the bands due to the interconnection of the anchor ends 17,17 of the outer bands 44 and 46 by the bridging section 25 in the free or released position to provide greater roundness and thus less drag between the bands and the clutch drum. Also, when the band is applied to the drum, engagement is more uniform throughout the three parallel bands 44,45,46. Obviously, the ties 12 and 38 in the band could be initially removed followed by the bracket ties 26 and 32 to obtain the same result.

FIG. 18 discloses an elongated strap 51 to form the reverse double wrap band which is generally similar to the strap 10 in having longitudinally extending slots 52 with transverse ties 53; however, the end 55 of the central band 54 extends farther beyond the ends 57 of the outside bands 56 at the one end and, at the opposite end, the ends 59 of the outer bands extend farther beyond the end 58 of the central band. Likewise the bracket member 61 (FIGS. 19 and 20) of the reverse band is more elongated with a connecting bar portion 62, an anchor portion 63 connected to the bar portion by a pair of elongated ties 64, and an apply portion 68 connected to the bar portion 62 by a single elongated tie 69. The anchor portion 63 is formed with a central circumferentially extending raised bridging section 65 having an upwardly bent convex portion 66, and a pair of upwardly bent ears 67,67 punched out of the member aligned with the outer bands 56 of the elongated strap 51 to receive anchor struts or pins thereagainst.

The apply portion 68 includes a punched out concave central upwardly extending lip 71 and a pair of punched out side tabs 72,72 slightly rearwardly and laterally of the lip 71 to positively locate the apply piston pin (not shown) against the lip 71; the tabs 72,72 preventing lateral misalignment of the piston. The process of forming the final double wrap band assembly for the reverse band is substantially the same as described and shown in FIGS. 1 through 17.

TECHNICAL ADVANTAGES

The present double wrap brake band and the method of making the same has several technical advantages over presently manufactured double wrap bands as follows:
1. Less material is utilized for the band and bracket to provide a lighter weight unit.
2. Lower running drag loss on the drum with the band in the open position.
3. An improved fatigue life for the band resulting from utilization of a higher hardness range.
4. Where the bracket and strap are brazed together, there is improved reliability over a welded only assembly.
5. Better alignment of the bands in open position and better engaged conformity.
6. The assembly has a lower unit cost as stampings are used instead of forgings and all machining operations are eliminated.
7. There is an improved bonding of the friction lining to the band.
8. A more uniform product is achieved.
9. A non-asbestos band lining is utilized.

We claim:

1. The method of making a double wrap brake band including the steps of stamping an elongated flat strap with longitudinally extending parallel slots and transverse ties interrupting the slots, stamping a one-piece bracket member having a transverse connecting bar portion, a transverse anchor portion and an apply portion connected by longitudinally extending ties, forming the slotted strap into an arcuate band and overlapping the bracket member onto the opposite ends of the strap and joining to form an assembly, heat treating the assembly, bonding a preslotted friction lining to the interior surface of the strap, and cutting out the ties in the bracket member and the ties in the strap and friction lining to complete the double wrap band.

2. The method as set forth in claim 1, in which the bracket member is joined to the strap by spot welding.

3. The method as set forth in claim 1, in which the bracket member is joined to the strap by spot welding, and then the bracket member and strap are brazed together.

4. The method as set forth in claim 1, including the step of heat setting the joined assembly to preserve the roundness thereof in the open position.

5. The method as set forth in claim 4, in which the interior surface of the heat set assembly is acid etched to prepare for bonding of the lining thereto.

6. The method as set forth in claim 1, in which the transverse connecting bar portion is attached to the ends of all three bands defined by the longitudinal slots, the anchor portion is attached to the free ends of the outside bands and the apply portion is attached solely to the free end of the central band.

7. The method as set forth in claim 1, in which the preslotted friction lining comprise generally parallel bands joined by transverse ties aligned with the ties in said strap.

8. The method as set forth in claim 4, including the step of expanding the band during heat setting.

* * * * *